United States Patent Office 3,850,886
Patented Nov. 26, 1974

3,850,886
NEUTRALIZED POLY(OXYALKYLENE)-POLY-ESTER-POLY(MONOSULFIDE) - POLYTHIOL BASED SEALANTS
Richard C. Doss, Bartlesville, Okla., assignor to Phillips Petroleum Company
No Drawing. Filed Apr. 27, 1973, Ser. No. 355,026
Int. Cl. C08g 23/20
U.S. Cl. 260—76                                10 Claims

ABSTRACT OF THE DISCLOSURE

Sealant or coating formulations having improved physical properties upon curing comprising polymercaptan-terminated polymers such as poly(oxyalkylene) - polyester - poly(monosulfide) - polythiols are provided by neutralizing acid substances present following polymer production to reduce the acid number of the polymer thereby yielding a neutralized polymer without separation of the alkaline earth metal salts and any unreacted alkaline earth metal hydroxide produced which upon being formulated with non-elastomeric components and curing agents results in said improved compositions.

---

This invention relates to polymercaptan-terminated polymers useful in the production of sealant or coating formulations. In accordance with another aspect, this invention relates to the production of polymercaptan-terminated polymers such as poly(oxyalkylene) - polyester-poly(monosulfide)-polythiols which have been neutralized following synthesis to provide a polymer curable to sealant compositions having improved physical properties. In accordance with another aspect, this invention relates to a process for the production of poly(oxyalkylene) - polyester - poly(monosulfide) - polythiols which are neutralized by alkaline earth metal hydroxide following synthesis to reduce the acid number thereby yielding a polymeric material which can be formulated with conventional sealant components to yield a sealant or coating composition having a desirable balance of properties.

Accordingly, it is an object of this invention to provide sealants based on polymercaptan-terminated polymers.

It is another object of this invention to provide a process for the production of polymercaptan-terminated polymers having use in sealant formulations.

Another object of this invention is to provide more readily curable sealant formulations.

Another object of this invention is to provide sealants with a desirable balance of physical properties.

Another object of this invention is to provide cured sealant compositions having improved flexibility properties.

Other objects, aspects and the several advantages of this invention will be apparent to those skilled in the art from a study of this disclosure and the appended claims.

In accordance with the invention, sealant compositions having a desirable balance of physical properties are prepared by curing a mixture comprising a polymercaptan-terminated polymer having an acid number value less than about 1, at least one curing agent and the balance being non-elastomeric components including fillers, plasticizers, antioxidants, adhesion promoters, and the like.

Further in accordance with the invention, in the production of sealant or coating formulations comprising polymercaptan-terminated polymers acid substances present following the synthesis of the polymer are neutralized by admixing an alkaline earth metal hydroxide with the polymer during or preferably prior to the step of curing the polymer without separation of the alkaline earth metal salts produced.

In accordance with a specific embodiment of this invention, the polymercaptan-terminated polymers comprise a poly(oxyalkylene) - polyester - poly(monosulfide)-polythiol having an average of more than 2 mercapto groups per molecule and are prepared by the reaction of a poly(oxyalkylene)-polyol with a mercaptoalkanoic acid and a thiodialkanoic acid.

The acid substances which are normally present and which are thus neutralized comprise acid catalyst used in the esterification of the poly(oxyalkylene) - polyol and/or carboxylic acids comprising polymer products having free carboxyl groups and/or minor amounts of unreacted carboxylic acid reactants. The neutralization of these acid substances is quite important when selected common curing agents such as lead dioxide are used since the presence of substantial amounts of acids such as are normally present following the esterification reaction inhibits the curing of the polymer by these curing agents to an unacceptably large extent and makes necessary the use of higher curing temperatures and/or a large amount of curing agent than would otherwise be required.

Although an alkaline earth metal hydroxide has been employed previously to neutralize the acids present, the earlier usual practice entailed neutralization of the cooled esterification reaction mixture comprising a solution of the polyester, together with acid substances, followed by a rather long filtration operation prior to solvent removal. Not only does the process of this invention obviate the need to carry out this filtration step, but also alkaline earth metal compounds, including any salts produced by reaction of the alkaline earth metal hydroxide with polymer molecules having a carboxy group, are not lost, creating a waste disposal problem, but are utilized as part of the sealant or coating formulation. Furthermore, when the alkaline earth metal compounds are allowed to remain in accordance with the process of this invention, and the resulting product is cured in a conventional sealant formulation, using a curing agent such as lead dioxide, the sealant produced has a desirable balance of properties, including greater flexibility than that exhibited by a comparable sealant prepared in the usual way involving filtration and removal of alkaline earth metal compounds.

Alkaline earth metal hydroxides which can be employed as neutralizing agents in the process of this invention include magnesium hydroxide, calcium hydroxide, strontium hydroxide, barium hydroxide, and mixtures thereof. In view of its lower cost, calcium hydroxide presently is preferred.

The poly(oxyalkylene) - polyester - poly(monosulfide)-polythiols having an average of more than two mercaptan groups per molecule can be produced by reacting at least one mercaptoalkanoic acid and at least one thiodialkanoic acid with poly(oxyalkylene)-polyols having an average of more than two hydroxy groups per molecule.

The mercaptoalkanoic acids which can be used to prepare the poly(oxyalkylene) - polyester - poly(monosulfide)-polythiols can be represented by the formula $HS(CR_2)_nCOOH$, wherein each R is hydrogen or an alkyl radical having 1 to about 5 carbon atoms, with a total of not more than about 10 carbon atoms in all R groups per molecule; and wherein $n$ is an integer in the range of 1 to about 5. Examples of some mercaptoalkanoic acids which can be employed include mercaptoacetic acid, 3 - mercaptopropionic acid, 2 - mercaptopropionic acid, 4 - mercaptobutyric acid, 3 - isopropyl-5-mercaptovaleric acid, 2 - ethyl - 3 - tert-butyl-5-mercaptovaleric acid, 2 - propyl - 3 - mercaptoheptanoic acid, 3-pentyl - 6 - mercaptoundecanoic acid, and the like, and mixtures thereof.

The thiodialkanoic acids which can be employed in the production of the poly(oxyalkylene)-polyester-poly- (monosulfide)-polythiols can be represented by the formula $HOOC(CR_2)_nS(CR_2)_nCOOH$, wherein R and n are as defined above, with a total of not more than about 20 carbon atoms in all R groups per molecule. Examples of suitable thiodialkanoic acids which can be used include thiodiacetic acid, 3,3'-thiodipropionic acid, 2,2'-thiodipropionic acid, 2,3'-thiodipropionic acid, 4,4'- thiodibutyric acid, 5,5'-thiobis(3-isopropylvaleric acid), 5,5'-thiobis(2-ethyl-3-tert-butylvaleric acid), 3,3'-thiobis(2-propylheptanoic acid), 6,6'-thiobis(3-pentylundecanoic acid), 4-(carboxymethylthio)valeric acid, and the like, and mixtures thereof.

A particularly preferred procedure for reacting the mercaptoalkanoic acids and thiodialkanoic acids with the poly(oxyalkylene)-polyols is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acids with thiodialkanoic acids. The presently preferred procedure for preparing such mixtures of mercaptoalkanoic and thiodialkanoic acids is by hydrolyzing a mixture of mercapto nitriles and thiodinitriles which can be produced from alkenenitriles and hydrogen sulfide according to processes known to the art such as that described in U.S. 3,280,163. For example, according to a presently preferred procedure, acrylonitrile can be reacted with hydrogen sulfide in the presence of sulfur and a weak organic base to form a mixture consisting largely of 3-mercaptopropionitrile and 3,3'-thiodipropionitrile, containing minor amounts of other nitriles, which mixture can be subsequently hydrolyzed, without the necessity of separation, to form a suitable mixture of largely 3-mercaptopropionic acid and 3,3'-thiodipropionic acid, together with minor amounts of other carboxylic acids. Representative examples of nitriles that can be used are set forth in U.S. 3,280,163.

The poly(oxyalkylene)-polyols used in the preparation of the poly(oxyalkylene)-polyester-poly(monosulfide)-polythiols employed in this invention have an average of more than 2, preferably at least 2.5, hydroxy groups per molecule and molecular weights of from about 200 to about 20,000. These substances can be produced by the reaction of one or more epoxy-substituted hydrocarbons having the general formula

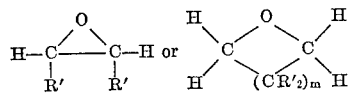

wherein each R' is hydrogen or an alkyl radical, the total number of carbon atoms per molecule being within the range of 2 to about 20, and m is an integer of from 1 to about 10, preferably 1 to 3, with a polyol having the formula $Y(OH)_x$, wherein Y is a hydrocarbon radical having at least 2, preferably 3 to about 30, carbon atoms, and a valence equal to the value of x, x is an integer of at least 2 and preferably 3 to about 12, and the number of carbon atoms per molecule of $Y(OH)_x$ is equal to or greater than x. Preferably Y is a saturated aliphatic, saturated cycloaliphatic, or aromatic radical, or combintion thereof, having at least three hydroxy groups per molecule. Examples of some polyols which can be used include ethylene glycol, glycerol, 1,3-propanediol, 2-butene-1,4-diol, erythritol, pentaerythritol, tris(hydroxymethyl)methane, 3-(hydroxymethyl)-1,5-pentanediol, 1,2,6-hexanetriol, 2-methyl - 1,2,4,6,8,10-decanehexol, 1,2,4,6,7,9,12,14,15,17, 19,20-eicosanedodecol, 1,2,40-tetracontanetriol, 4-cyclohexene-1,2-diol, 1,4-cyclohexanediol, 1,5,9-cyclododecanetriol, 1,2,3,4-cyclopentanetetrol, 2-methyl-1,3,5-cyclo-octanetriol, 4-(1,2,-dihydroxyethyl)cyclohexanol, resorcinol, phloroglucinol, 2,4,6-trihydroxytoluene, α,α-bis(p-hydroxyphenyl)benzyl alcohol, 1,4,5,8-naphthalenetetrol, and the like, and mixtures thereof. Examples of some epoxy-substituted hydrocarbons which can be used in the preparation of the poly(oxyalkylene)-polyols include 1, 2-epoxyethane, 1,2-epoxypropane, 1,3-epoxypropane, 1,4-epoxybutane, 1,5-epoxypentane, 3-methyl-1,8-epoxyoctane, 4-octyl-1,12-epoxydodecane, 3-ethyl-5-isopropyl-1, 10-epoxydecane, 2-butyl-1,6-epoxyhexane, 3-decyl-1,5-epoxypentane, 2-heptadecyl-1,3-epoxypropane, 1,2-epoxybutane, 2-methyl-3,4-epoxyheptane, 1,2-epoxyoctane, 2-3-epoxydodecane, 4-ethyl-1,2-epoxytetradecane, 1,2-epoxyeicosane, and the like, and mixtures thereof.

The poly(oxyalkylene)-polyols can be prepared by contacting at least one polyol of the formula $Y(OH)_x$, as defined above, with an epoxy-substituted hydrocarbon, as defined above, under suitable polymerization conditions, as is known to the art. For instance, glycerol or 1, 2,6-hexanetriol can be contacted with an excess of propylene oxide (1,2-epoxypropane) under elevated pressure and in the presence of suitable polymerization promoters. Products of this type can be obtained from commercial sources. In the preparation of poly(oxyalkylene)-polyols having an average of more than two hydroxy groups per molecule, mixtures of the above polyols such as at least one diol and another polyol of higher functionality can be reacted with the epoxy-substituted hydrocarbons defined above to form poly(oxyalkylene)polyols having an average of more than two hydroxy groups per molecule. For instance, a mixture of 1,4-butanediol and 1,2,6-hexantriol can be reacted with ethylene oxide to produce a poly(oxyethylene) - polyol having an average of more than two hydroxy groups per molecule. Alternatively, a poly(oxyalkylene)-polyol produced, e.g., by the reaction of a diol such as ethylene glycol with an alkylene oxide such as propylene oxide can be mixed with another poly(oxyalkylene)-polyol produced, e.g., by the reaction of a triol such as 1,2,6-hexanetriol with an alkyleneoxide such as propylene oxide.

The mixtures of mercaptoalkanoic acids and thiodialkanoic acids can be reacted with the poly(oxyalkylene)-polyols to form poly(oxyalkylene)-polyester-poly(monosulfide)-polythiols by an esterification reaction which can be effected in any suitable equipment at temperatures preferably in the range of about 50 to about 250° C. preferably the reaction is conducted in the presence of diluents that are substantially completely inert to the reactants and products under the reaction conditions employed. Such diluents can compromise as much as 95 weight percent of the components charged to the reactor. Acid esterification catalysts such as p-toluenesulfonic acid, benzenesulfonic acid, sulfuric acid, and the like can also be employed, if desired, to accelerate the rate of reaction. In that event, the diluents employed also should be inert to the acid catalyst. Examples of suitable inert diluents include hydrocarbons such as toluene, benzene, xylene, cyclohexane, heptane, and the like, and mixtures thereof. The reaction pressure should be sufficient to prevent excessive loss of reactants and/or solvent at operating temperatures. Satisfactory pressures are normally within the range of about 0.5 to about 10 atmospheres.

It is normally desirable to provide a means of removing water of reaction during the course of the esterification. This function can be accomplished by means known to the art, e.g., by azeotropic distillation. Preferably, an inert gas such as nitrogen or helium is passed through the liquid mixture and out through the condensation system, thereby facilitatig water removal during the esterification and, furthermore, serving to protect the poly(oxyalkylene)-polyol and mercaptan groups from oxidation and/or thermal degradation.

The properties of the poly(oxyalkylene)-polyester-poly(monosulfide)-polythiols will vary somewhat depending upon the reactants employed, the ratios of the various reactants, and other reaction conditions. Normally these polymers will be viscous liquid shortchain polymers, the chain length depending to considerable extent on the ratios of thiodialkanoic acid to mercaptoalkanoic acid used. In general, higher ratios of thiodialkanoic acid to mercaptoalkanoic acid yield longer polymer chains and a more viscous liquid or near solid product.

The esterification reaction should be effected to such an extent that at least about 80 percent of the hydroxy groups of the poly(oxyalkylene)-polyol are reacted with carboxy groups of the mercaptoalkanoic acid or thiodialkanoic acid to form ester groups. In general, in the range of about 0.8 to about 1.2 equivalents of hydroxy groups of the poly(oxyalkylene)-polyol should be employed for each equivalent of carboxy groups of the mercaptoalkanoic acid and thiodialkanoic acid. In general, an average of more than 2, preferably at least 2.5, ester groups are formed for each molecule of poly(oxyalkylene)-polyol. Following the esterification reaction, the diluent, if employed, is separated from the poly(oxyalkylene)-polyester-poly(monosulfide)-polythiol in conventional manner, e.g. by distillation.

Although the alkaline earth metal hydroxide can be added to the poly(oxyalkylene) - polyester - poly(monosulfide)-polythiol any time after diluent, if used, has been removed, until the polymer is contacted with the curing agent, the alkaline earth metal hydroxide preferably is added to the polymer just preceding or during formulation of the polymer with fillers, pigments, and the like to produce a premix which is subsequently contacted with a curing agent. Generally, it is desirable that the alkaline earth metal hydroxide be used in an amount at least sufficient to reduce the acid number (mg. KOH/g. polymer) to a value of less than 1. In general, the quantity of alkaline earth metal hydroxide employed should be within the range of about 1 to about 20, preferably about 2 to about 10, times the amount calculated to be required to react with all the acids present in the polymer, in a neutralization reaction, the calculated amount being based on the acid number as conventionally determined by titration with sodium hydroxide or potassium hydroxide. After mixing of the alkaline earth metal hydroxide with the polymer, the temperature of the mixture should be maintained relatively low, preferably at about ambient room temperatures, e.g., about 25° C., to avoid premature curing, until the desired curing step.

Materials that can be employed together with the poly(oxyalkylene) - polyester-poly(monosulfide) - polythiol and alkaline earth metal hydroxide in sealant and coating formulations include any material conventionally used as a non-elastomeric component of sealant and coating formulations, e.g., fillers, pigments, plasticizers, extenders, stabilizers, thickeners, other modifiers, and the like such as calcium carbonate, titanium dioxide, silica, iron oxide, carbon black, dibutyl phthalate, chlorinated hydrocarbons, hydrogenated polyphenyls, alumina, zirconia, polyethylene, polystyrene, 2,2'-methylenebis(4-methyl-6-tert-butylphenol), and the like. To the resulting premix is added the curing agent, preferably along with water to serve as a binder for the thickener, if employed in the preparation of the premix, and an adhesion promoter, e.g., partially hydrolyzed gamma-glycidoxypropyltrimethoxysilane. The blending of ingredients can be achieved by conventional methods such as hand-mixing or machine-blending, the particular technique depending in part upon available equipment and the requirements of the sealant or coating application problem.

The amount of poly(oxyalkylene)-polyester-poly(monosulfide)-polythiol present in the sealant or coating formulations containing non-elastomeric components will vary appreciably depending upon the desired final characteristics of the sealant or coating composition. However, in general, the amount of poly(oxyalkylene)-polyester-poly(monosulfide)-polythiol present in the sealant or coating formulation, excluding curing agent, will range from about 25 to about 98 percent by weight, preferably being within the range of about 40 to about 80 percent by weight. The remainder can comprise non-elastomeric components in varying proportions depending upon the characteristics of the poly(oxyalkylene)-polyester-poly(monosulfide)-polythiol and the final composition desired.

The poly(oxyalkylene) - polyester - poly(monosulfide)-polythiols in the sealant or coating formulations of this invention can be cured with conventional curing agents including free oxygen-containing fluids such as, for example, air; peroxy compounds such as, for example, di-tert-butyl peroxide and cumene hydroperoxide; metal oxides such as, for example, the oxides of lead, zinc, manganese, calcium, barium, copper, mercury, tin, and iron; metal salts of carboxylic acids such as, for example, lead stearate, zinc laurate, and zinc acetate; ammonium and alkali metal chromates and persulfates; sulfur; and the like. The curing time will vary with the polymer, the curing agent, the sealant or coating formulation, and the temperature. In general, sufficient curing agent is employed to convert at least about 70 percent of the mercapto groups in the polymer to polysulfide linkages.

The sealant and coating formulations of this invention can be employed to join or coat various substrates. For example, substrates such as wood; plastics; glass; stone such as granite, marble, or the like; concrete; or metal such as aluminum, steel, iron, zinc, or the like can be joined or coated.

EXAMPLE I

A mixture consisting largely of 3-mercaptopropionitrile and 3,3'-thiodipropionitrile, with minor amounts of other components, was prepared in the following manner. A mixture of 17.1 pounds sulfur and 1140 pounds hydrogen sulfide was heated to 122° F. (50° C.)/450 p.s.i.g. in a 500-gallon stirred reactor. A solution of 890 pounds acrylonitrile containing 8.5 pounds 2-methyl-5-ethylpyridine was pumped slowly into the bottom of the reactor over a period of several hours, the reactor temperature being maintained at 122–126° F. (50–52° C.). As the reaction proceeded, the pressure dropped below 300 p.s.i.g. After the addition of the acrylonitrile and 2-methyl-5-ethylpyridine, the reaction mixture was stirred for about 7 hours at 122° F. (50° C.) to ensure completion of the reaction. Unreacted hydrogen sulfide was flared off, and 9 pounds of p-toluenesulfonic acid monohydrate was added as a stabilizer. Gas chromatographic analysis of the resulting product showed it to have the following composition.

| Component: | Weight Percent |
|---|---|
| Lights | 0.5 |
| 3-Mercaptopropionitrile | 73.6 |
| 2,3'-Thiodipropionitrile | 1.5 |
| 3,3'-Thiodipropionitrile | 20.0 |
| 3,3'-Dithiodipropionitrile | 3.8 |
| Unknown | 0.6 |

EXAMPLE II

A portion of the product described in Example I was hydrolyzed to the corresponding acids. To 100 pounds of the above mixture of nitriles at 150° F. (66° C.) in a 100-gallon glass-lined stirred reactor was added slowly within a period of 1 hour 179 pounds of concentrated hydrochloric acid, resulting in a slight exotherm. The reaction temperature was then maintained at 190–210° F. (88–99° C.) for 3 hours after the acid addition was complete. Water and hydrochloric acid were removed at 210° F. (99° C.) at a pressure of less than 50 mm. Hg. After addition of 649 pounds of xylene, the residual mixture was heated at 212° F. (100° C.). Both heating and stirring were then stopped, at which time ammonium chloride by-product settled. Analysis of a sample of the hot supernatant xylene solution indicated it contained 9.45 weight percent 3-mercaptopropionic acid and 5.10 weight percent dicarboxylic acids, calculated as thiodipropionic acid and comprising largely 3,3'-thiodipropionic acid with minor amounts of 2,3'-thiodipropionic acid and 3,3'-dithiodipropionic acid. The hot slurry was then filtered through a pre-coated Sparkler filter, and the filtrate was passed into a 1000-gallon glass-lined stirred reactor. The residue was washed with 644 pounds of xylene, and the washings were combined with the filtrate in the 1000-gallon reactor. Analysis of the resulting xylene solution indicated it contained 5.61 weight percent 3-mercaptopropionic acid and 3.14 weight percent of the dicarboxylic acids shown above, calculated as above. Thus, the xylene solution contained about 104 pounds of the mixture of carboxylic acids.

EXAMPLE III

The above mixture of carboxylic acids was esterified with Niax LHT-34 poly(oxyalkylene)-polyol (derived from 1,2,6-hexanetriol and propylene oxide, and having an equivalent weight of 1690 and a hydroxyl number of 33.2). To the 1000-gallon reactor containing the above 104 pounds of the mixture of carboxylic acids and 1087 pounds of xylene was added 1690 pounds of Niax LHT-34 poly(oxyalkylene)-polyol, 15 pounds of p-toluenesulfonic acid monohydrate, and 2366 pounds of xylene. The ratio of hydroxy groups in the poly(oxyalkylene)-polyol to carboxy groups in the mixture of acids was about 0.90:1. As the reaction mixture was stirred and heated, a slow stream of nitrogen was passed from the bottom of the reactor through the liquid mixture and out through the condensing system. This nitrogen stream facilitated water removal during the esterification reaction and served to protect the poly(oxyalkylene)-polyol and mercaptan groups from oxidation and/or thermal degradation. An induction tube was used to periodically sample the reaction mixture to determine the extent of esterification by means of carboxylic acid and mercaptan analysis. A modified Dean-Stark sight-glass was provided to remove water, azeotroped with xylene, as it formed. Water began to azeotrope at 215° F. (102° C.). The pot temperature was gradually increased to a maximum of 280° F. (138° C.) at the end of 48 hours. After the esterification was complete, as determined by the leveling off of the carboxylic acid content, the reaction mixture was cooled to about 70° F. (21° C.), and an aliquot of approximately 15 gallons of the mixture was separated from the remaining, major portion of the reaction mixture. Xylene was removed from the 15-gallon aliquot by heating under reduced pressure, without neutralization of acid components. The poly(oxyalkylene)-polyester-poly-(monosulfide)-polythiol having an average of more than two mercapto groups per molecule, obtained as a residual product, had a mercaptan sulfur content of 1.05 weight percent, an acid number (mg./KOH/g. sample) of 4.5, and a viscosity of 4246 cps. at 25° C.

To the above major portion of the reaction mixture remaining after separation of the 15-gallon aliquot was added as a neutralizing agent 100 pounds of calcium hydroxide slurried in 100 gallons of xylene. The mixture was stirred four hours and filtered through a pre-coated Sparkler filter. The filtrate was heated to a maximum of 200° F. (93° C.)/20 mm. Hg with nitrogen bubbling through the liquid phase to enhance removal of xylene. Approximately 1500 pounds of poly(oxyalkylene)-polyester-poly(monosulfide)-polythiol having an average of more than two mercaptan groups per molecule was obtained as a residual product having a mercaptan sulfur content of 0.96 weight percent, an acid number (mg. KOH/g. sample) of 0.19, and a viscosity of 11,520 cps. at 25° C.

EXAMPLE IV

In accordance with the process of this invention, a sealant premix was prepared through use of the poly(oxyalkylene)-polyester-poly(monosulfide)-polythiol having an acid number of 4.5, as described in Example III. With 2000 g. of this polymer, which contained 0.16 gram-equivalent of acid, was mixed 30 g. (0.81 gram-equivalent) of calcium hydroxide for 30 minutes. To the resulting mixture were added 160 g. Cab-O-Sil fumed silica, 400 g. titanium dioxide, 50 g. of a solution containing 2 weight percent elemental sulfur dissolved in Clorafin 50 chlorinated paraffin wax, 20 g. Cyanamid 2246 antioxidant [2,2'-methylenebis(4-methyl-6-tert-butylphenol)], 800 g. calcium carbonate, 15 g. yellow pigment (Cadmium Yellow 1476 from Harshaw Chemical Co.), 12 g. carbon black (N765 from Phillips Petroleum Company), and 250 g. Clorafin 50 chlorinated paraffin wax. These components were then mixed for about two hours at atmospheric pressure and for an additional two hours under reduced pressure (less than 2 inches Hg). The resulting premix, herein designated as Premix A, was cured as described below.

In accordance with a process outside the scope of this invention, a sealant premix was prepared through use of the poly(oxyalkylene)-polyester-poly(monosulfide)-polythiol having an acid number of 0.19, as described in Example III. This premix, herein designated as Premix B, was prepared in the manner shown above for the preparation of Premix A, using the same amounts of ingredients, except that no calcium hydroxide was mixed with the polymer.

Another premix was prepared by a process outside the scope of this invention. This premix, herein designated as Premix C, was prepared in the same manner as Premix B except that the poly(oxyalkylene)-polyester-poly(monosulfide)-polythiol used was that employed in the preparation of Premix A.

Premix A, Premix B, and Premix C were each cured, or subjected to curing conditions, and the resulting cured products were evaluated, in the following manner. To 25 parts by weight of the premix were added 0.808 part by weight of a 1:1, by weight, mixture of lead dioxide and organic dispersant, 0.133 part by weight partially hydrolyzed gamma-glycidoxypropyltrimethoxysilane (and aliquot of the product prepared from 2.36 parts by weight gamma-glycidoxypropyltimethoxysilane and 0.36 part by weight water), and 0.30 part by weight water. The ingredients were hand-mixed, and the resulting mixture was cast into a picture frame mold 2½ inch x 2½ inches x ⅛ inch. The composition was then allowed to set at ambient room temperature (about 25° C.) for 14 days. The cured sealant slab was removed from the frame, and properties were determined by the method of ASTM D 638–56T on a sample 2½ inches x ⅛ inch cut from the slab. The results are shown in Table I.

TABLE I

| | Cured premix A | Cured premix B | Cured premix C |
|---|---|---|---|
| 50% modulus, p.s.i. | 99.2 | 103 | Insufficient cure. |
| 100% modulus, p.s.i. | 143.3 | 159 | |
| Tensile break, p.s.i. | 302 | 251 | |
| Elongation, percent | 390 | 245 | |

As shown in Table I, Cured Premix A, a cured sealant produced by the process of this invention, had a desirable balance of properties. Particularly, Cured Premix A exhibited greater flexibility, as indicated by the much higher value for percent elongation, than did Cured Premix B, a cured sealant produced by a process outside the scope of this invention. Because an alkaline earth metal hydroxide was not employed to reduce the high acid number of the poly(oxyalkylene) - polyester - poly(monosulfide)-polythiol used in the preparation of Cured Premix C, which was produced by a process outside the scope of this invention, this premix underwent insufficient curing to permit determination of modulus, tensile break, and elongation.

I claim:

1. A process of producing a polymercaptan-terminated polymeric composition curable to sealants and coating formulations having improved properties which comprises:
(a) reacting
(1) a mercaptoalkanoic acid having the formula HS(CR$_2$)$_n$COOH wherein R is selected from the group consisting of hydrogen and alkyl radicals having from 1-5, inclusive, carbon atoms, the maximum number of carbon atoms in all R groups being 10, and $n$ is an integer ranging from 1-5, with
(2) a thiodialkanoic acid having the formula HOOC(CR$_2$)$_n$S(CR$_2$)$_n$COOH wherein R and $n$ are as defined above, the maximum number of carbon atoms in all R groups being 20, and
(3) a poly(oxyalkylene)-polyol having on average more than two pendent hydroxy groups per molecule and a molecular weight in the range 200–20,000, the amount of (3) present being in the range 0.8–1.2 equivalents of pendent hydroxy groups for each equivalent of carboxylic groups of the mercaptoalkanoic and thiodialkanoic acids,
(b) neutralizing the polymercaptan-terminated polymer thus produced by admixing therewith an alkaline earth metal hydroxide in an amount sufficient to reduce the acid number (mg. KOH/g. polymer) of said polymer to a value less than about one, and
(c) formulating the neutralized polymer without separation of the alkaline earth metal salts and any unreacted alkaline earth metal hydroxide produced with non-elastomeric components including fillers, plasticizers, antioxidants, and adhesion promoters.

2. A process according to claim 1 which includes the steps of adding to the formulation of step (c) a curing agent in an amount sufficient to convert at least about 70 percent of the pendent thiol groups to polysulfide groups, and
(d) allowing the thus-prepared formulation to cure to form sealants and coatings having a desirable balance of properties.

3. A process according to claim 1 wherein said curing agent is lead dioxide and said polythiol is neutralized with calcium hydroxide.

4. A process according to claim 1 wherein said reacting is carried out in the presence of an inert solvent which is removed from the polymeric reaction product prior to neutralization, and the temperature during neutralization is retained at a temperature low enough to avoid pre-curing after admixing the polymer with the neutralizing agent.

5. A process according to claim 1 wherein (a) is formed by reacting (1) 3-mercaptopropionic acid, (2) thiodipropionic acid, (3) a poly(oxyalkylene) - polyol formed by reacting 1,2,6-hexanetriol and propylene oxide, and (a) is neutralized in step (b) with calcium hydroxide, and further wherein the amount of (1) employed ranges from 60 to 80 weight percent based on the total of (1) and (2).

6. A curable sealant composition formed according to the process of claim 1 comprising:
(a) about 25 to about 98 weight percent of a neutralized poly(oxyalkylene) - polyester-poly(monosulfide)-polythiol having an average of more than two mercapto groups per molecule and an acid number mg. KOH/g. polymer) value less than about one and which contains alkaline earth metal salts and any unreacted alkaline earth metal hydroxide, and
(b) the balance non-elastomeric components selected from fillers, plasticizers, antioxidants, and adhesion promoters.

7. A composition according to claim 6 which contains at least one curing agent in an amount sufficient to convert at least about 70 percent of the pendent thiol groups to polysulfide groups.

8. A composition according to claim 6 wherein (a) is the reaction product of
(1) a mercaptoalkanoic acid having the formula HS(CR$_2$)$_n$COOH wherein R is selected from the group consisting of hydrogen and alkyl radicals having from 1-5, inclusive, carbon atoms, the maximum number of carbon atoms in all R groups being 10, and $n$ is an integer ranging from 1-5,
(2) a thiodialkanoic acid having the formula $$HOOC(CR_2)_nS(CR_2)_nCOOH$$

wherein R and $n$ are as defined above, the maximum number of carbon atoms in all R groups being 20,
(3) a poly(oxyalkylene)-polyol having on average more than two pendent hydroxy groups per molecule and a molecular weight in the range 200–20,000, the amount of (3) being in the range of 0.8–1.2 equivalents of pendent hydroxy groups for each equivalent of carboxylic groups of the mercaptoalkanoic and thiodialkanoic acids, and
(4) an alkaline earth metal hydroxide.

9. A composition according to claim 8 wherein (a) is formed by reacting (1) 3-mercaptopropionic acid, (2) thiodipropionic acid, (3) a poly(oxyalkylene) - polyol formed by reacting 1,2,6-hexanetriol and propylene oxide, and (4) calcium hydroxide, and further wherein the amount of (1) employed ranges from 60 to 80 weight percent based on the total of (1) and (2).

10. A composition according to claim 6 which contains lead dioxide as the curing agent.

References Cited
UNITED STATES PATENTS
3,717,617    2/1973    Marrs et al.

OTHER REFERENCES
Jones et al., Ser. No. 250,291.

MELVIN GOLDSTEIN, Primary Examiner

U.S. Cl. X.R.

260—33.8 R, 40 R, 755